July 17, 1951  M. C. GAUTHIER  2,561,196
SOLDERING FIXTURE
Filed Jan. 21, 1947  2 Sheets-Sheet 1
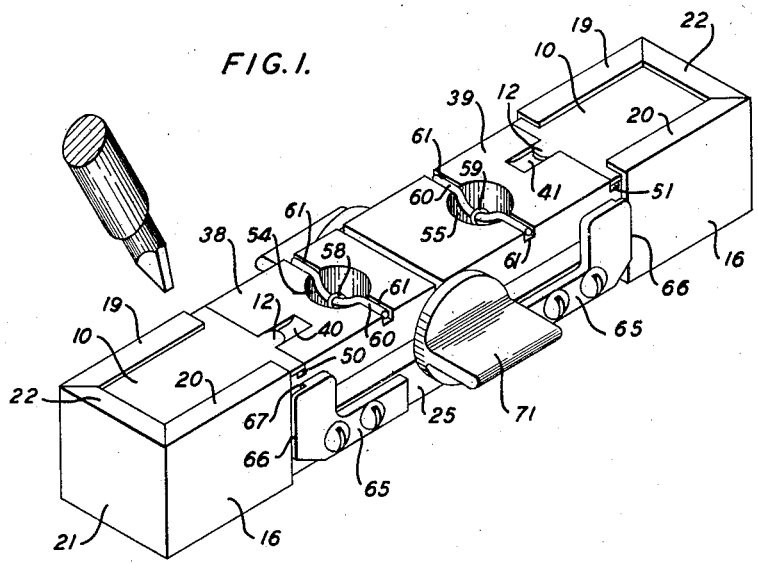
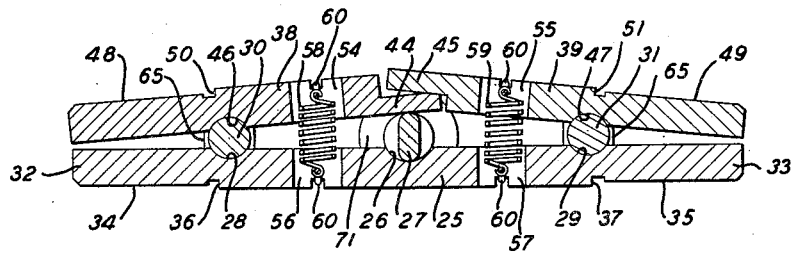
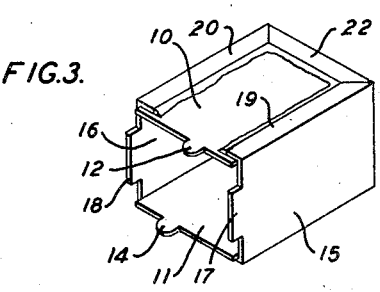
INVENTOR
M.C. GAUTHIER
BY W.C. Parnell
ATTORNEY July 17, 1951  M. C. GAUTHIER  2,561,196
SOLDERING FIXTURE Filed Jan. 21, 1947  2 Sheets-Sheet 2

INVENTOR
M.C.GAUTHIER
BY W.C. Parnell
ATTORNEY

Patented July 17, 1951

2,561,196

UNITED STATES PATENT OFFICE 2,561,196

SOLDERING FIXTURE

Marcel C. Gauthier, Montclair, N. J., assignor to Western Electric Company, Incorporated, New York, N. Y., a corporation of New York Application January 21, 1947, Serial No. 723,274

3 Claims. (Cl. 113—100)

This invention relates to soldering fixtures, and more particularly to fixtures for holding can parts in place during soldering operations thereon.

Numerous electrical units for the communication arts require metal containers or cans, the sizes and forms of which depend upon the size and contour of the units they are to house, some of them being extremely small and difficult to assemble with the present known soldering fixtures.

An object of the invention is to provide a soldering fixture which is simple in structure, readily actuable and highly efficient in simultaneously holding parts for a plurality of cans for soldering.

With this and other objects in view, the invention comprises a soldering fixture having like ends with fixed position holding members and companion movable members, supported by fulcrums about which they are normally urged into their holding positions, and means actuable to move the companion members simultaneously relative to their fixed position members to receive parts of articles which are to be soldered together.

More specifically the soldering fixture includes a single member having like ends to receive and locate parts of an article, movable members having their outer ends formed to receive and locate other parts of articles, fulcrums carried by the single member for the movable members and springs connecting the movable members to the single member to normally urge the movable members into holding positions. The parts, received and located by the ends of the single member as well as by the outer ends of the movable members, constitute the sides of cans which are to be completed through soldering operations while held by the soldering fixture. The main bodies of the cans, including the ends with their connecting bottom portions and their side flanges, are placed over the ends of the members of the soldering fixture and guided into positions by retaining brackets supported by the single member of the fixture. An actuator, in the form of a cam, is positioned in a groove of the single member adjacent the overlapping inner ends of the movable members. The cam has a flattened central portion upon which the overlapping ends of the movable members rest when in their holding positions, urged by the springs to hold the sides for the cans firmly in place against their flanges until the soldering operations have been completed, after which rotation of the cam will rock the movable members about their fulcrums toward their respective ends of the single member to free the completed cans therefrom and condition the fixture to receive the parts of other cans to be soldered together.

Other objects and advantages will be apparent from the following detailed description when considered in conjunction with the accompanying drawings, wherein Fig. 1 is a perspective view of the soldering fixture showing the parts of cans in position for soldering;

Fig. 2 is a longitudinal sectional view of the soldering fixture showing the movable members thereof in open or loading positions;

Fig. 3 is a perspective view of one of the completed cans;

Figure 5:
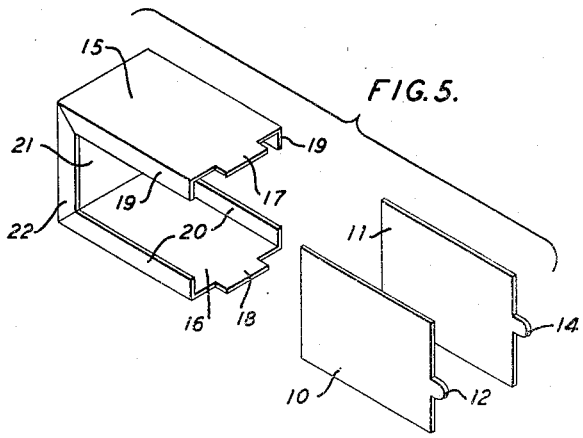
Fig. 5 is a perspective view of the parts for one of the cans.

Referring now to the drawings, attention is first directed to Fig. 5 which illustrates the sides 10 and 11 for the can, these sides having integral tabs 12 and 14 thereon. The sides 10 and 11 may be identical in configuration, but preferably the tabs are located off-center and one side is turned over so that the tabs are in out of aligned positions, where they are more effective in holding a top on the can after the unit is disposed within the can. The main body of the can includes an integral structure composed of ends 15 and 16 having lips 17 and 18 together with integral flanges 19 and 20. The ends 15 and 16 are connected by the integral bottom portion 21 which also has integral flanges 22 similar to the flanges 19 and 20. The purpose of the fixture is to hold the ends 15 and 16 parallel with each other and to hold the sides 10 and 11 closely adjacent their flanges 19, 20 and 22 during soldering of the sides to the flanges adjacent the edges of the flanges.

The soldering fixture includes a single member 25 centrally grooved at 26, to receive an actuator or cam 27, and grooved at equally spaced positions 28 and 29 to receive fulcrum pins 30 and 31. The outer ends 32 and 33 are reduced in thickness to provide surfaces 34 and 35 to receive their respective sides 10—11 of the cans. The reduced portions of the ends 32 and 33 provide shoulders 36 and 37 against which the leading ends of the sides 10—11 will lie to accurately locate these sides for the soldering operations. There are also grooved portions (not shown) for the tabs 12—14 to further serve in accurately locating the sides 10—11 in place, these grooves being identical with the grooves illustrated in the movable members 38 and 39 and identified by reference numerals 40 and 41. The movable members 38 and 39 throughout their combined lengths are identical with the member 25 with the exception that their inner ends have reduced portions 44 and 45 which overlap each other adjacent the actuator 27. The members 38 and 39 are grooved at 46 and 47 respectively to receive the fulcrum pins 30 and 31. The outer ends of the movable members 38 and 39 are reduced in thickness to provide surfaces 48 and 49 to receive their respective sides 10—11, the abutting shoulders 50 and 51 cooperating with the notches 40 and 41 to accurately locate the sides with the main body of the cans.

Figure 4:
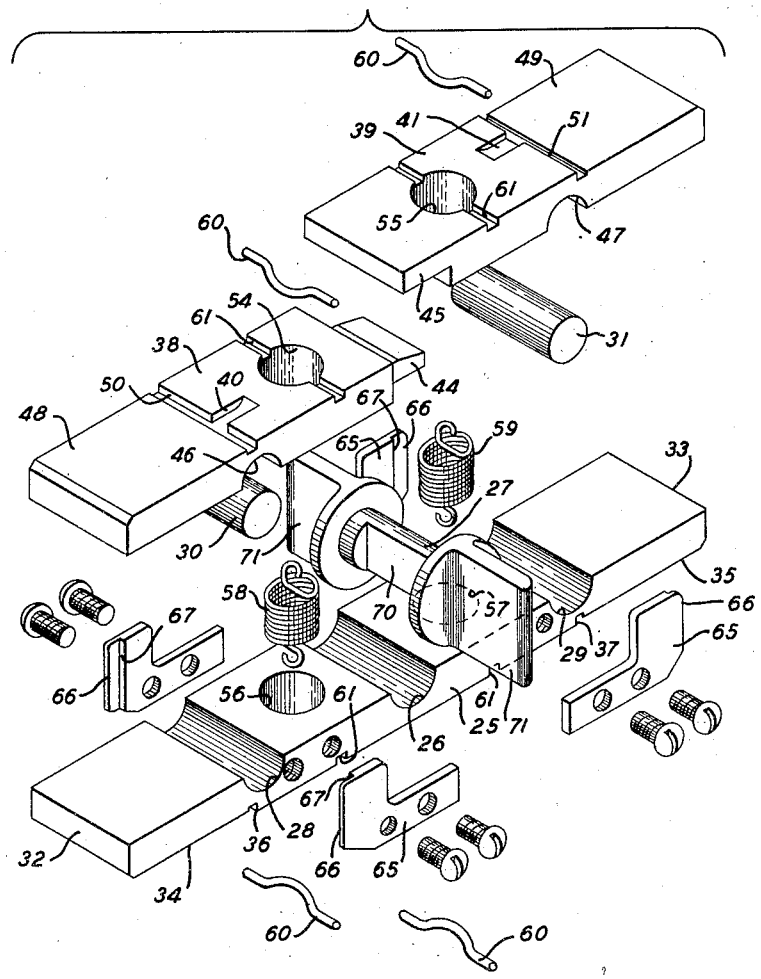
Fig. 4 is an exploded perspective view of the soldering fixture.

Apertures 54 and 55 in the movable members 38 and 39 are positioned in alignment with apertures 56 and 57 of the member 25 to receive springs 58 and 59 held in place by pins 60 of the contour shown in Fig. 4. The straight ends of the pins lie in notches 61 while their bent central portions curve inwardly within their apertures to assure positive connection between the ends of the springs and their respective members, and to maintain the supporting surfaces of the fixture flat so that it will not rock during soldering operations.

Retaining brackets 65 are mounted in pairs upon each side of the member 25 with reduced portions 66 to receive the lips 17 and 18 of the ends of the cans to hold them in proper positions parallel with each other, shoulders 67 of the brackets serving also to locate the ends in proper positions with respect to the sides 10 and 11.

The actuator 27 has a flattened central portion 70 which will permit the movable members 38 and 39 to lie parallel with the member 25 and in alignment with each other when in the holding or soldering positions. This flattened portion 70 of the actuator also functions as illustrated in Fig. 2 to move the members 38 and 39 into the loading or unloading positions. Handle portions 71 upon each end of the actuator 27 enable the operator to readily actuate it.

Considering now the function of the soldering fixture, let it be assumed that the fixture is in the loading position shown in Fig. 2. A group of the parts for two cams will be selected. One of the sides will be properly positioned within the main can body to rest upon the lowermost flanges thereof, while the other side for this can assembly will be placed upon the adjacent movable member 38. The main can structure may then be moved into position over the ends 32 and 48, the operator holding the ends 15 and 16 of the can inwardly so that the lips 17 and 18 will be guided back of their brackets 65 until they engage the shoulders 67. When this has been accomplished, the tabs 12 and 14 of the sides 10 and 11 have been located in their respective notches and the leading edges of the sides will engage the shoulders 36 and 50. In a similar manner the parts for another can may be assembled on the other end of the soldering fixture, after which the actuator is turned to allow the springs 58 and 59 to move the movable members 38 and 39 into holding positions as shown in Fig. 1. The force supplied by the springs will hold every part of the can on each end of the fixture against displacement, firmly supporting the sides of the cans during the soldering operations.

With this fixture, a plurality of cans are held for soldering operations during a single actuation of the fixture. Furthermore, both sides of the fixture are flat and may rest firmly upon a bench or other suitable support while the upper sides of the cans are being soldered to their respective flanges. It is, therefore, apparent that after the upper sides of both cans are soldered in place, the fixture with the cans may be turned over to position the opposing sides to be soldered. After the soldering operations have been completed, the cans may be readily removed by turning the actuator 27 one-quarter of a revolution freeing the completed cans for removal from the fixture, the fixture remaining in its loading position until the parts for another group of cans are assembled thereon.

Although specific improvements of the invention have been shown and described, it will be understood that they are but illustrative and that various modifications may be made therein without departing from the scope and spirit of this invention as defined by the appended claims.

What is claimed is:

1. A soldering fixture for containers to include main parts with flanges at open sides thereof and side parts to be positioned within the main parts and soldered to the flanges at the open sides, the fixture comprising a member having outer ends formed to receive and locate certain of the side parts relative to their respective flanges of the main parts, companion elements normally positioned in alignment with each other, parallel with the member with interfitting inner ends extending beyond the center of the member and outer ends formed to receive and locate the other side parts of the containers relative to their respective flanges of the main parts, fulcrums for the elements positioned intermediate their ends, an actuator positioned between the member and the interfitting inner ends of the elements to move these ends of the elements outwardly about their fulcrums to move the outer ends of the elements toward the adjacent ends of the member to free the containers, and spring means urging the elements into their normal positions to firmly hold side parts of containers against the flanges at the open sides of the main parts.

2. A soldering fixture for containers to include main parts with flanges at open sides thereof and side parts to be positioned within the main parts and soldered to the flanges of the open sides, the fixture comprising a member having outer ends formed to receive and locate certain of the side parts relative to their respective flanges of the main parts, companion elements normally positioned in alignment with each other, parallel with the member with inner ends extending beyond the center of the member and outer ends formed to receive and locate other side parts of the containers relative to their respective flanges of the main parts, fulcrums for the elements positioned intermediate their ends, an actuator positioned between the member and the inner ends of the elements to move these ends of the elemens outwardly about their fulcrums to move the outer ends of the elements toward the adjacent ends of the member to free the containers, and springs having their ends connected respectively to their elements and the member to firmly hold the side parts of containers against the flanges, at the open ends of the main parts and constituting the sole means for connecting the elements to the member.

3. A soldering fixture for containers to include main parts with flanges at open sides thereof and side parts to be positioned within the main parts and soldered to the flanges of the open sides, the fixture comprising a member having outer ends formed to receive and locate certain of the side parts relative to their respective flanges of the main parts, companion elements normally positioned in alignment with each other, parallel with the member with inner ends extending beyond the center of the member and outer ends formed to receive and locate other side parts of the containers relative to their respective flanges of the main parts, retaining projections carried by the member to hold the adjacent edges of the main parts against displacement, fulcrums for the elements positioned intermediate their ends, an actuator positioned between the member and the inner ends of the elements to move these ends of the elements outwardly about their fulcrums to move the outer ends of the elements toward the adjacent ends of the member to free the containers, and springs having their ends connected respectively to their elements and the member to firmly hold the side parts of containers against the flanges at the open ends of the main parts and constituting the sole means for connecting the elements to the member.

MARCEL C. GAUTHIER.

REFERENCES CITED

The following references are of record in the file of this patent:

UNITED STATES PATENTS

| Number | Name | Date |
| --- | --- | --- |
| 214,441 | Perkins | Apr. 15, 1879 |
| 281,648 | Sweitzer | July 17, 1883 |
| 417,380 | Ayars | Dec. 17, 1889 |
| 624,722 | Allen | May 9, 1899 |
| 827,711 | Conti | Aug. 7, 1906 |
| 1,100,486 | Merliss | June 16, 1914 |
| 1,132,052 | Wattmann | Mar. 16, 1914 |
| 2,384,148 | Yeager | Sept. 4, 1945 |
| 2,421,973 | Trimble | June 10, 1947 |
| 2,437,485 | Sonnenschein | Mar. 9, 1948 |
| 2,448,311 | Hill | Aug. 31, 1948 |